July 11, 1950 — L. B. GREEN — 2,514,486

MOLDING MACHINE

Filed Nov. 21, 1945 — 5 Sheets-Sheet 1

INVENTOR.
LEE B. GREEN
BY
Kwis Hudson Boughton & Williams
ATTORNEYS

July 11, 1950 L. B. GREEN 2,514,486
MOLDING MACHINE
Filed Nov. 21, 1945 5 Sheets-Sheet 2
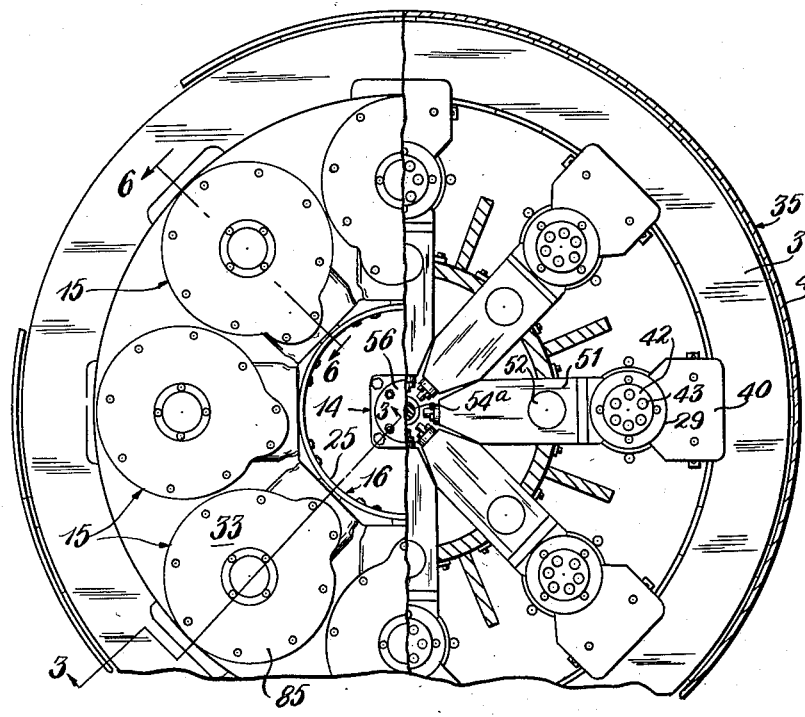
FIG. 2
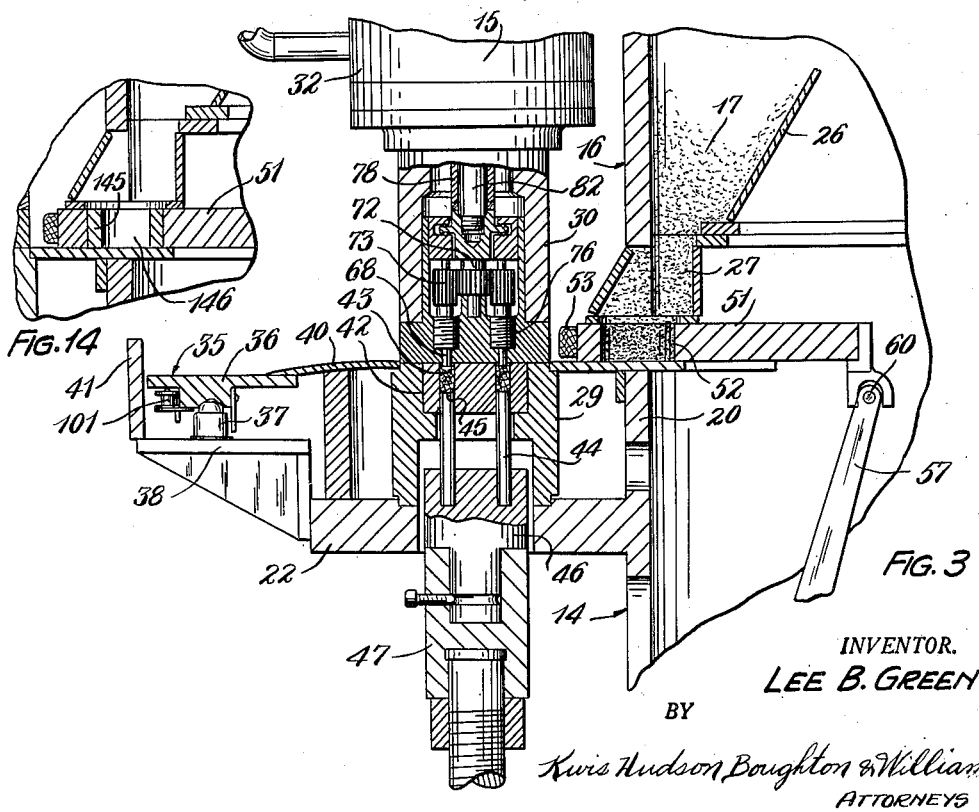
FIG. 14
FIG. 3
INVENTOR.
LEE B. GREEN
BY
Kwis Hudson, Boughton & Williams
ATTORNEYS July 11, 1950 L. B. GREEN 2,514,486
MOLDING MACHINE
Filed Nov. 21, 1945 5 Sheets-Sheet 3
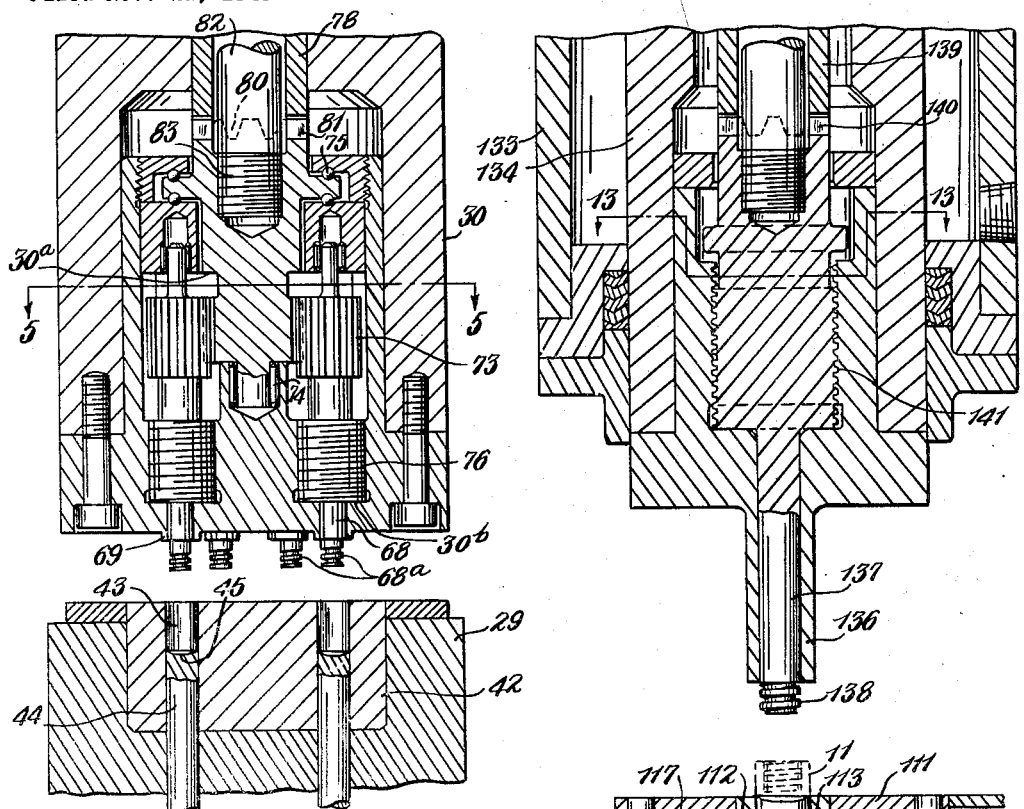
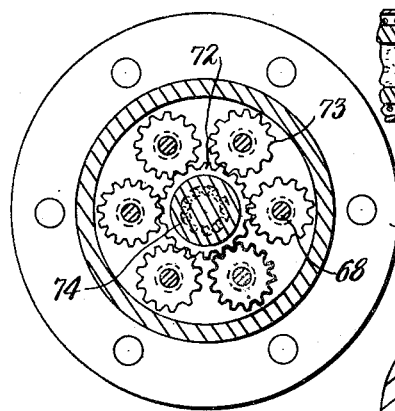
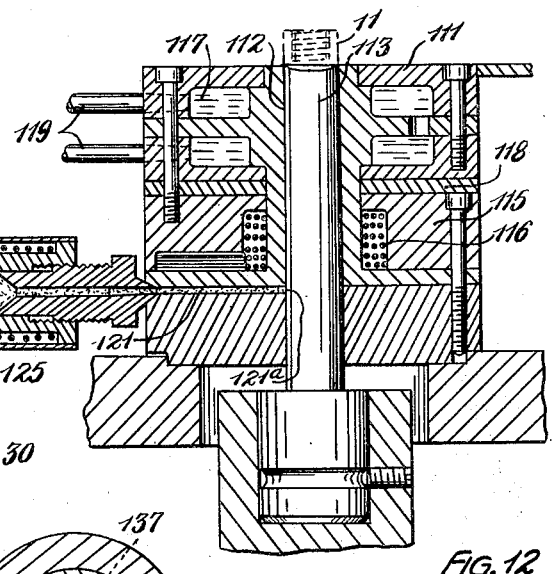
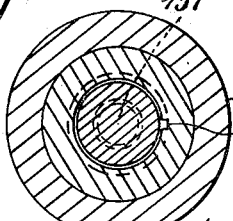
INVENTOR.
LEE B. GREEN
BY
Kwis Hudson Boughton & Williams
ATTORNEYS

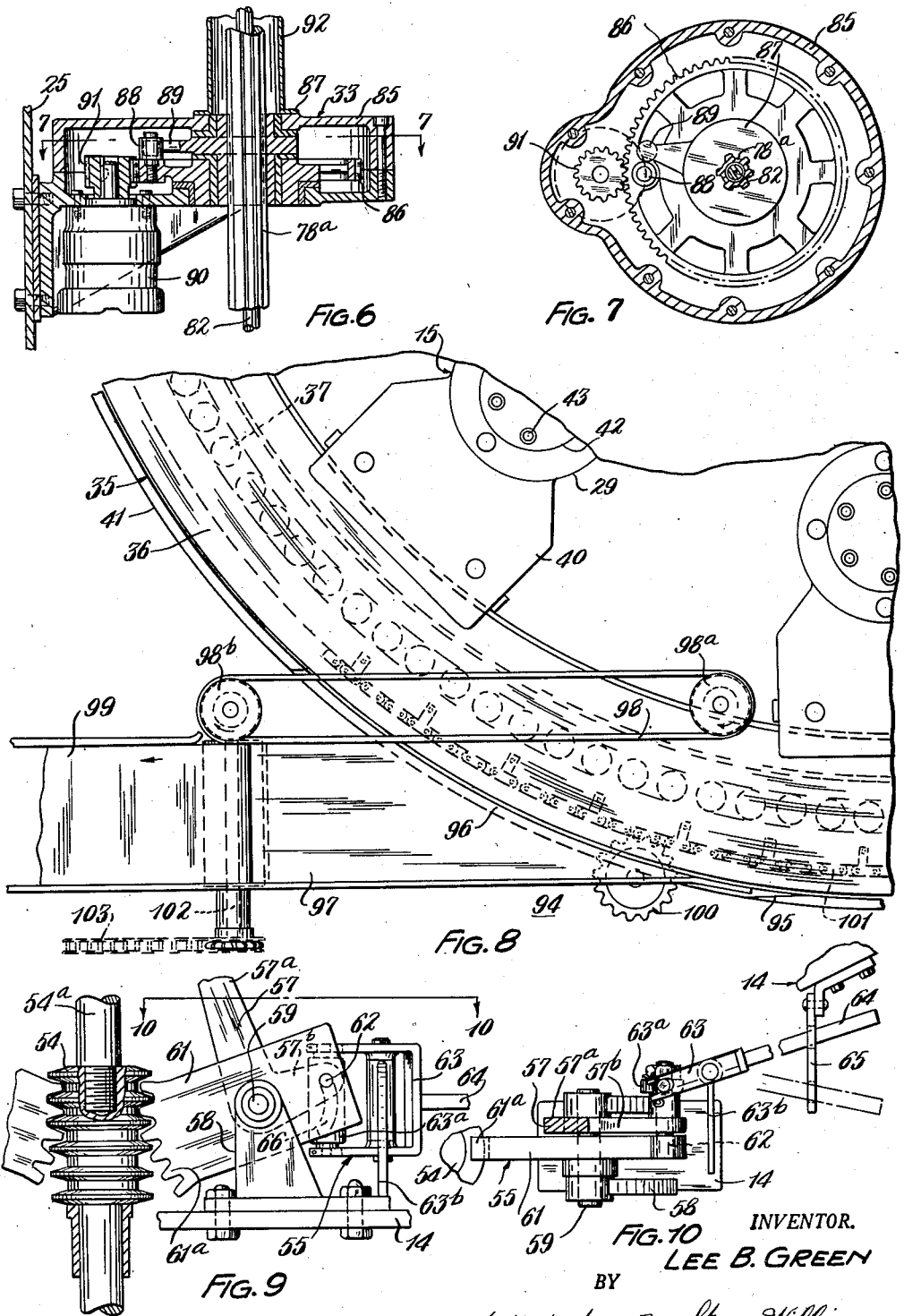

Patented July 11, 1950

2,514,486

UNITED STATES PATENT OFFICE 2,514,486

MOLDING MACHINE

Lee B. Green, Lakewood, Ohio

Application November 21, 1945, Serial No. 630,086

19 Claims. (Cl. 18—5)

This invention relates to apparatus for molding articles from plastic material and, as one of its objects, aims to provide improved apparatus of this kind by which plastic articles can be produced very rapidly and economically.

Another object of the present invention is to provide an improved molding machine which can be used in producing a variety of different plastic articles and which can be used to particular advantage in producing threaded plastic articles, such as bottle caps, because it embodies novel means for disengaging the thread-forming die member from the molded article.

A further object of the invention is to provide an improved molding machine of the character mentioned, in which the die members are capable of producing a group of the plastic articles in one molding operation and novel means is employed for disengaging one of the die members from the molded articles.

Still another object of this invention is to provide an improved plastic molding machine having a plurality of molding units disposed in a group and in which moldable material is fed by novel means to the respective units from a single or central magazine.

A further object of the invention is to provide improved multiple unit molding apparatus in which the molding units are disposed in an annular or polygonal group and the central magazine is located inside the group.

Yet another object is to provide an improved plastic molding machine of the type having such grouped units and central magazine and wherein novel conveying means is disposed relative to the units so as to receive the molded articles therefrom.

This invention also seeks to provide improved molding apparatus of the character mentioned, which embodies a group of individual molding units and wherein one or more units can be temporarily cut out and rendered inoperative while the others continue in operation.

The invention can be further briefly summarized as consisting in certain novel combinations and arrangements of parts hereinafter described and particularly set out in the appended claims.

Fig. 2 is a plan view of the machine showing the same partly in horizontal section as indicated by section line 2—2 of Fig. 1.

Fig. 3 is a partial sectional elevation showing the cooperating die members of one unit of the machine and the material feeding means which serves the die members of such unit, the view being taken substantially as indicated by line 3—3 of Fig. 2.

Fig. 4 is a partial vertical sectional view on a larger scale taken through the die members of one of the units and showing the means for actuating the grouped die plungers.

Fig. 5 is a transverse sectional view taken on line 5—5 of Fig. 4 and further illustrating the actuating means for the grouped die plungers.

Fig. 6 is a partial vertical sectional view taken through another part of the die plunger actuating means as indicated by line 6—6 of Fig. 2.

Fig. 7 is a sectional plan view thereof taken on line 7—7 of Fig. 6.

Fig. 8 is another partial plan view of the multiple unit machine and showing the conveying and collecting means for the molded articles.

Fig. 9 is a partial elevational view showing the mechanism for actuating the shuttles which feed the moldable material to the respective units.

Fig. 10 is a partial plan view of such mechanism as seen from the direction indicated by line 10—10 of Fig. 9.

Fig. 12 is a sectional elevation taken through the die members thereof.

Fig. 13 is a transverse sectional view taken on line 13—13 of Fig. 12.

Fig. 14 is a sectional detail view taken through one of the feed shuttles and showing a modification thereof.

Fig. 15 is a plan view showing a bottle cap and representing one form of plastic article which can be produced by the improved molding machine, and Fig. 16 is a sectional view taken through the bottle cap as indicated by line 16—16 of Fig. 15.

Figure 1:
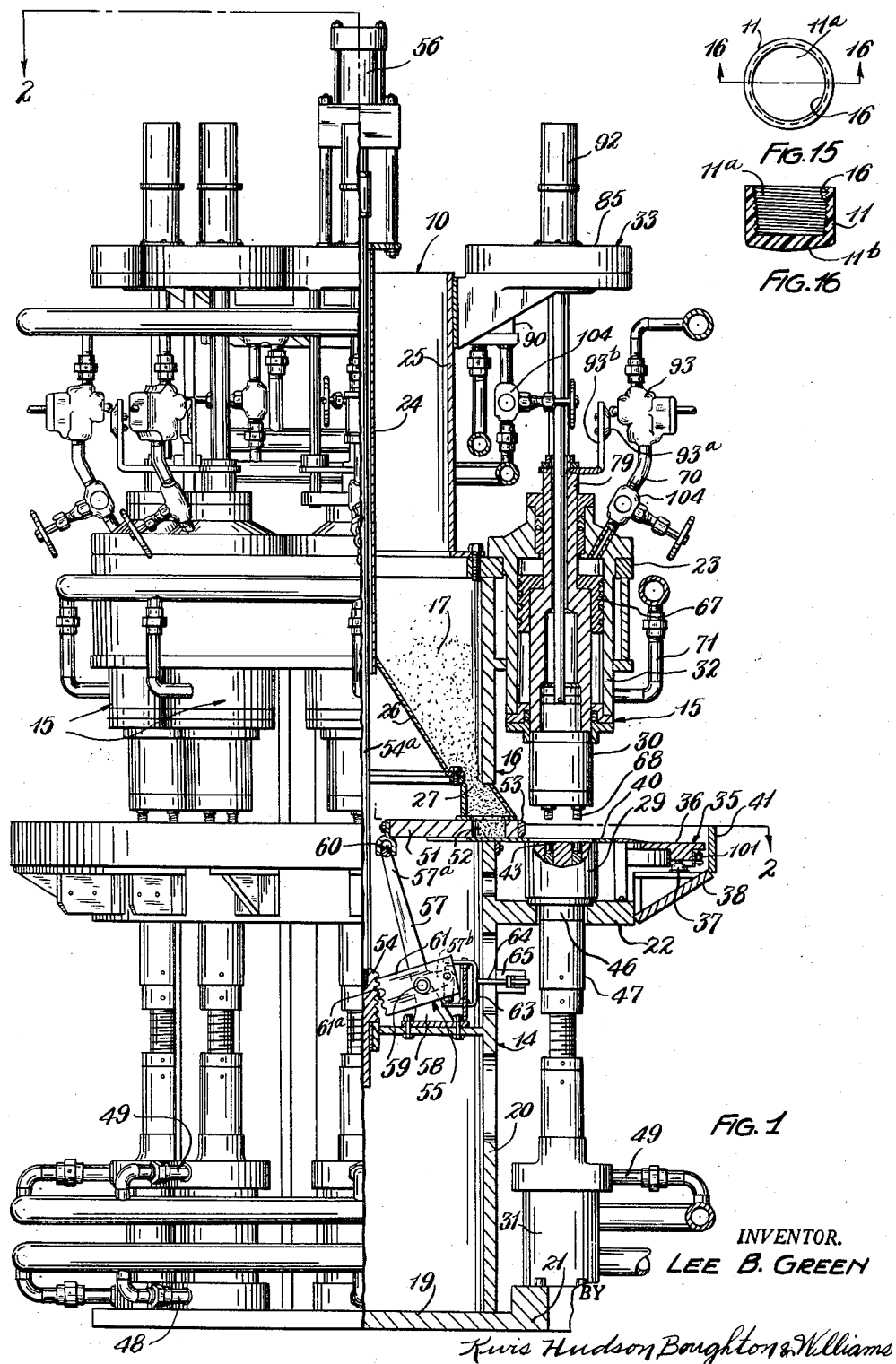
Fig. 1 is an elevational view of a multiple unit plastic molding machine embodying the present invention, portions of the machine being shown in vertical section.

In the embodiment of the invention illustrated in Figs. 1, 2 and 3, the drawings show a multiple unit molding machine 10 which can be used for rapidly and economically producing plastic articles such as the molded bottle cap 11 shown in Figs. 15 and 16 or various other molded articles. The bottle cap 11 here shown is of a conventional form having therein a recess 11a and an internal screw thread 12 molded in the side wall of the recess. The particular cap here shown also has a convexly rounded top 11b. One of the problems presented in molding plastic articles having such a threaded portion is the step of disengaging the thread-forming portion of the die from the molded article. This is accomplished in the present machine by novel means and in a practical manner as will be explained hereinafter.

The machine 10 includes a frame 14 which provides a support for the various members constituting the respective molding units 15. The individual molding units 15 are served by a common or central magazine 16 which contains a supply of any suitable moldable material 17 such as a plastic material in powder, granular or pellet form. These molding units can be arranged in a row adjacent the magazine 16, or preferably as here shown, are disposed in an annular or polygonal group which surrounds the magazine. The molding units 15 are preferably also disposed in an upright relation which conserves space and permits the magazine 16 to be disposed in a central upright position so that the feeding of the moldable material 17 will be assisted by gravity.

The frame 14 can be of any appropriate construction and shape and, as shown in this instance, includes a substantially horizontal base 19 adapted to stand upon a floor or other support and a hollow central member or column 20 extending above such base. The base 19 projects laterally beyond the column 20 to form an annular cylinder support 21 to which further reference will presently be made. At different distances above the cylinder support 21 the column 20 is provided with surrounding annular ledge or table portions 22 and 23. The frame 14 also includes inner and outer upright tubular members 24 and 25 which form the inner and outer walls respectively of the upper portion of the magazine 16. The tubular members 24 and 25 are mounted on the upper portion of the hollow central column 20 and themselves form supports for various parts of the molding units. The inner tubular member 24 preferably extends downwardly beyond the outer tubular member 25 and partway into the upper end of the hollow column 20. The bottom wall of the magazine 16 is formed by an inclined annular plate 26 which extends downwardly and outwardly from the lower end of the tubular member 24 for directing the moldable material toward annularly spaced feed openings 27 which serve the respective molding units 15.

Each of the molding units 15 includes a stationary die body 29 supported on the annular shelf 22 of the frame 14 and a die head 30 which is disposed above the die body and is movable toward and away from the latter. Each molding unit 15 also includes a lower actuating cylinder 31 mounted on the annular cylinder support 21 and an upper actuating cylinder 32 supported by the annular shelf 23 and located in substantial vertical alignment with the die body 29 and the lower cylinder 31. Each of the units 15 also includes a die plunger actuating device 33 which is supported on the upright tubular member 25 and is located above and in substantial alignment with the upper cylinder 32.

In addition to the main portions of the molding machine 10 which have already been referred to above, the machine includes a conveyor 35 for receiving and collecting the molded articles. This conveyor includes a traveling conveyor member 36 which extends adjacent the stationary die body 29 and when the mold units 15 are in an annularly grouped arrangement as here shown, this movable conveyor member is in the form of an annular member extending around the group. The conveyor member 36 is supported for annular movement as by an annularly extending row of bearing members 37 which are mounted on a frame extension 38, the latter being supported by the shelf 22 of the frame 14.

As shown in Fig. 1, the movable conveyor member 36 is located at substantially the same height as the top of the die body 29 so that molded articles displaced in a direction laterally or radially outwardly from the die body will be transferred onto this conveyor member. A substantially horizontally disposed feed plate 40 located at an elevation corresponding with the top of the stationary die body 29 spans the space between the die body and the conveyor member 36 and forms a support on which the molded articles can be slid during their movement outwardly to the conveyor member. An upright annular guard rail 41 extending around the conveyor member 36 prevents the articles from falling off of this conveyor member or being projected therebeyond while being discharged from the die body 29.

As best seen in Figs. 3 and 4, the stationary die body 29 comprises a hollow member in the upper end of which is located a die insert 42 having one or more bores or die cavities 43 of a shape corresponding with the exterior of the article to be molded. In this instance the die insert 42 is provided with a group of six such die cavities which are disposed in an annular group surrounding the central vertical axis of the die mechanism. Since the bottle cap 11 is circular in plan shape the bores or die cavities 43 are of a corresponding cylindrical shape although they can be of any other desired plan shape according to the form of the article to be molded.

The die body 29 also includes a lower die member or plunger, or as shown in this instance, a group of lower die members or plungers 44 whose upper ends extend into and are slidable in the die cavities 43. The plungers 44 form the closure members for the lower ends of the die cavities 43 and, in this instance, the tops of the plungers are of a concave shape as indicated at 45 to correspond with the convexly curved top 11b of the bottle cap 11. The lower die plungers 44 are carried by a holder 46 which is, in turn, connected with an upright actuating rod 47. The lower end of this actuating rod extends into and is connected with the piston of the lower actuating cylinder 31. This cylinder is a double-acting cylinder and when suitable motive fluid, such as oil under pressure, is supplied to its lower end by the fluid connection 48 the plungers 44 will be moved upwardly to apply pressure to the moldable material in the die cavities 43 and to subsequently lift the molded articles out of the die cavities. When pressure fluid is supplied to the upper end of the cylinder 31 through the connection 49 the die plungers 45 are retracted or moved downwardly in the die cavities.

Moldable material from the magazine 16 is supplied to the die cavities 43 by novel feed mechanism which will be described next. This feed mechanism includes a feed slide or shuttle 51 for each of the molding units 15 and which shuttle is reciprocably movable across the upper face of the die body 29 and the die insert 42. The above mentioned feed plate 40 is extended laterally inwardly beyond the die body 29 and forms a support upon which the shuttle 51 is slidable. The shuttle 51 can be in the form of an elongated substantially flat block or slab and has a feed chamber 52 therein of suitable size and shape for holding an appropriate quantity of the moldable material 17. When the die body 29 is provided with a group of the die cavities 43, as mentioned above, the feed chamber 52 is of a size to encompass all of these cavities and to carry a sufficient quantity of material to provide a proper charge of moldable material in each of these cavities.

When the feed shuttle 51 is in its retracted position as shown in Figs. 1 and 3, the feed chamber 52 is in communication with the lower end of the magazine 16 through the feed passage 27 and then receives a charge of the moldable material 17 from the magazine. When the shuttle is moved outwardly through a feeding stroke the chamber 52 is translated to a position overlying and communicating with the die cavities 43, whereupon, the moldable material 17 will be fed downwardly into these cavities. After each such feeding stroke the shuttle is retracted to the charging position for refilling of the feed chamber 52 from the magazine 16 preparatory to the next feeding stroke.

The outer end of the shuttle 51 is provided with a thrust element or bumper 53, such as a block of wood or rubber, which kicks the previously molded article or articles off of the top of the mold body 29 with sufficient momentum to cause them to slide outwardly over the feed plate 40 onto the movable conveyor member 46.

The feed shuttles 51 for all of the molding units 15 can be actuated simultaneously and, for this purpose, the machine 10 is provided with a vertically reciprocable common actuating rack 54 (see Figs. 1 and 9). When the molding units are disposed in the annular group above described the rack 54 is annular or polygonal in shape and is located centrally of the group and carried by a vertical actuating rod 54a which extends through the tubular frame member 24. The upper end of the actuating rod 54a extends into a centrally disposed double-acting pressure fluid cylinder 56 and is connected with a piston therein. The feed shuttles 51 are connected with the rack 54 by linkages 55 which are substantially identical with each other and one of which will now be described.

The linkage 55 includes a bell crank lever 57 which is supported by a bracket 58 for swinging movement on a pivot 59. The shuttle 51 is connected with the upper end, that is, the relatively longer arm 57a of the lever 57 by a ball and socket connection 60. The linkage also includes a sector 61 adjacent which the lower end of the bell crank lever 57 is disposed and whose outer end has a toothed portion 61a which meshes with the rack 54. The sector 61 is also mounted for swinging movement on the pivot 59 of the bracket 58. The sector remains permanently in engagement with the rack 54 and is oscillated on the pivot 59 as the rack is reciprocated by the power cylinder 56. The relatively shorter arm 57b of the lever 57 is adapted to be connected with or disconnected from the sector 61 by the pin 62 according to whether the shuttle is to be actuated or rendered idle. Whenever it is desirable to render the feed shuttle of one of the molding units 15 inoperative the pin 62 of the corresponding linkage is withdrawn from an opening of the sector 61, whereupon, the sector will have an idle rocking movement on the pivot 59 and will be ineffective for rocking the lever 57.

The control pin 62 is suitably carried by the pivoted head 63a of the fork 63, the latter being pivotally mounted on the bracket 58 by the member 63b and adapted to be shifted by means of a handle 64 projecting therefrom. The handle 64 cooperates with a latch member 65 mounted on the frame 14 and when the handle is in its full line position of Fig. 10 the pin 62 will be engaged in the sector 61 for connecting the lever 57 for oscillation with the sector. When the handle 64 is shifted to its broken line position of Fig. 10 the pin 62 will be retracted from the sector and the feed shuttle 51 of the corresponding molding unit 15 will be rendered inoperative while the feed shuttles of other units may continue to operate. When the pin 62 is engaged in the sector 61 it oscillates with the sector and this movement of the pin is accommodated by the arcuate slot 66 of the pivoted fork head 63a.

The die head 30 comprises a generally cylindrical vertically elongated body whose upper end extends into the upper cylinder 32 and forms or carries a piston 67 which is reciprocable in this cylinder for actuating the die head. This die head carries one or more upper die plungers 68 which cooperate with the lower die plungers 44 for applying molding pressure to the moldable material previously fed to the die cavities 43. When the die insert 42 is provided with a group of the die cavities 43 as in this instance, a corresponding number of the plungers 68 is provided on the die head 30. The plungers 68 project from the lower end of the die head and are movable into the die cavities 43. These plungers are of a size to correspond with the recess 11a which is to be molded in the bottle caps 11 and have thread-forming portions 68a thereon for molding the internal threads 12 in the caps.

For closing the upper ends of the die cavities 43 so that the material therein can be subjected to pressure by the lower die plungers 45, the die head 30 is provided at its lower end with hollow extensions 69 of a size and shape to enter and close the die cavities. The upper die plungers 68 project from the die head 30 through these extensions and when the die head has been lowered to a position adjacent the die body 29 in which the die cavities are closed by the extension 69, the threaded portions 68a will extend into the die cavities in the proper relation for forming the internally threaded recesses 11a in the articles. Downward or closing movement is imparted to the die head 30 by supplying pressure fluid to the upper end of the cylinder 32 through the connection 70. Upward or opening movement is imparted to the die head 30 by supplying pressure fluid to the lower end of the cylinder 32 through the connection 71. Fig. 3 shows the die head in its lower or die closing position and with the material being molded to article form in the die cavities 43. From the construction just described it will be seen that the plungers 68 and the sleeves or hollow projections 69 together form the upper die members or composite die plungers.

When the articles 11 have been molded in the die cavities 43 the threaded portions 68a of the upper die plungers 68 will be locked in the die cavities by the molded articles by reason of the interengagement between the threads of the die plungers and the articles. Before lifting the die head 30 it is therefore necessary to disengage or unscrew the upper plungers 68 from the molded articles. To permit this to be done the plungers 68 are mounted in the die head 30 (see Fig. 4) for both rotary and axial movement. The rotary movement is imparted to all of the plungers 68 simultaneously by means of a driving pinion 72. Each of the plungers 68 has a gear 73 thereon which meshes with the driving pinion and, as shown in Fig. 5, the gears of the plungers form a group or cluster surrounding the pinion. The pinion is mounted in the die head 30 by suitable bearings 74 and 75 which hold the pinion against radial and axial movement. The gears 73 of the plungers 68 are of a greater axial length than the pinion 72 and remain in full engagement with the latter during the axial shifting of the plungers.

The axial movement of the plungers 68 is imparted thereto simultaneously with their rotation such that the threaded portions 68a will have a lead or axial movement appropriate for the threads which have been formed on the molded articles. For obtaining this axial movement the plungers and die head 30 are provided with cooperating screw elements 76 having the same lead or pitch as the thread which has been formed on the molded article. During the rotation of the plungers by the pinion 72 the thread elements 76 impart the desired axial movement so that the threaded portions 68a of the plungers will be unscrewed from the molded articles and retracted into or relative to the die head 30. Axial movement of the plungers 68 in an upward direction is limited by the engagement of their pinions with an abutment surface or stop 30a of the die head and axial movement in a downward direction is limited by the engagement of the thread carrying portions of the plungers with the abutment surfaces or stops 30b.

When the threaded portions 68a of the upper die plungers 68 have been disengaged from the molded articles in the manner just described the die head 30 is lifted or opened relative to the die body 29 by supplying pressure fluid to the lower end of the cylinder 32 through the connection 71. The lifting of the die head 30 disengages the extensions 69 thereof from the die cavities 43 thus leaving the cavities open for the ejection of the molded articles therefrom. Thereupon the lower cylinder 31 is operated to move the lower die plungers 44 upwardly in the die cavities. This upward movement of the plungers 44 lifts the molded articles out of the die cavities to an exposed position in which they can be engaged by the bumper 53 of the feed shuttle 51 for kicking the molded articles off of the die body 29 and across the plate 40 onto the movable member 36 of the conveyor 35.

The same movement of the shuttle 51 which kicks the molded articles from the die body 29 moves the feed chamber 52 to a position overlying the die cavities 43. At this point in the sequence of operation the lower cylinder 31 is operated to move the lower die plungers 49 in a downward direction, thereby sucking the moldable material from the feed chamber 52 into the die cavities 43. It is not necessary that the die plungers 44 actually produce a suction because in certain instances the moldable material may be of a character to flow by gravity downwardly into the die cavities substantially simultaneously with the downward movement of the plungers. When the die cavities have thus been filled with the moldable material, the die head 30 is moved to its closed position by supplying pressure fluid to the upper end of the cylinder 32 through the connection 70. This causes the extensions 69 of the die head to close the upper ends of the die cavities as mentioned above, thereupon, the upper die plungers 68 are actuated by imparting thereto the above described rotary and axial movement in a direction to cause the threaded portions 68a to be projected from the die head and moved into the die cavities 43 by being screwed into the moldable material.

When the threaded portions 68a have been moved into the die cavities for the proper distance, the actuation of the plungers is stopped and the condition of the molding dies is then one in which the cavities 43 are charged with moldable material and are in the closed condition with the thread-forming portions of the upper plungers 68 therein in their proper position. The moldable material is then subjected to pressure by actuating the lower cylinder 31 to move the lower die plungers 44 upwardly in the die cavities. The pressure applied by the plungers 44 causes the material to be compressed to the density and volume desired for the molded article. During the application of this pressure by the lower die plungers the upper cylinder 32 merely functions as a holding cylinder for holding the die head in its closed position.

The driving pinion 72 of the die head 30 is driven, in this instance, by a hollow shaft 78 which projects from the die head through the tubular extension 79 thereof. The lower end of the shaft 78 is provided with teeth or serrations 80 which are held in meshing relation with corresponding teeth or serrations 81 formed on the body of the pinion 72. These teeth are retained in meshing engagement with each other by the rod 82 which extends through the hollow shaft 78 and has its lower end connected with the pinion 72 by the threaded engagement 83. The hollow shaft 78 extends upwardly from the cylinder 32 into the housing of the device 33 which, as mentioned above, forms a part of the mechanism for disengaging the mold plungers 68 from the molded articles.

The device 33 is here shown as having a housing 85 suitably supported on the tubular frame member 25 and having a gear 86 rotatably mounted therein. The hollow shaft 78 has a splined portion 78a which extends through and cooperates with a splined hub 87 which is also rotatable in the housing 85. The gear 86 is disposed around the hub 87 but is not connected therewith. In disengaging the threaded portions 68a of the upper mold plungers 68 from the molded articles, it is desirable that the initial disengaging movement be imparted suddenly to these plunger portions. For this purpose, the gear 86 is provided with an upstanding pin or stop 88 and the hub 87 is provided with a radial arm 89 which cooperates with the stop 88 in forming a lost-motion driving connection between the hub and gear.

The gear 86 is driven by a suitable power device such as the fluid pressure rotary motor 90 having a driving pinion 91 meshing with the gear. When the threaded portions 68a of the die plungers have been projected from the die head 30 in the manner described above, the hub 87 will come to a stop by reason of the engagement of the plungers 68 with the abutment surface 30b of the die head. The fluid motor 90 will thereupon be stalled with the pin 88 of the gear 86 in engagement with the arm 89 of the hub 87. When the die plungers 68 are to be rotated to disengage the portions 68a from the molded articles, the fluid motor 90 is operated in the opposite direction causing the gear 86 to be rotated in a direction which carries the pin 88 away from the arm 89. The hub 87 will temporarily remain stationary and no rotative movement will then be imparted to the die plungers 68. However, when the pin 88 has travelled through a distance just short of a full revolution it will suddenly engage the arm 89 from the opposite side and by picking up the arm will rotate the hub 87 in the direction desired for disengaging the plunger portions 68a from the molded articles. The engagement of the pin 88 with the arm 89 in this manner causes a sudden initial actuation of the die plungers 68 which is desirable for breaking the portions 68a away from the molded articles. The lost-motion connection between the gear and hub also enables the motor 90 to accelerate to its working speed before picking up its load.

When the portions 68a have been fully disengaged from the articles by the above described combined rotary and axial movement, the upper ends of the plungers will engage the abutment surfaces 30a of the die head and further movement of the plungers and of the hub 87 will be stopped. The fluid motor 90 will again be stalled and will remain in this condition until its direction of rotation is reversed for again extending the die plungers relative to the die head. In connection with the device 33 it will be noted that the spline connection between the hub 87 and the hollow shaft 78 permits the hollow shaft to move upwardly and downwardly with the die head 30 without interfering with the rotation of the hollow shaft by the fluid motor 90. The portions of the shaft 78 and the rod 82 which extend above the housing of the device 33 can be covered and protected by an upright tubular extension 92 of the housing 85.

In the actuation of the die head 30 by the cylinder 32 as described above, it may be desirable to stop the upward movement of the piston 67 as soon as the die head has been lifted high enough above the die body 29 to accommodate the transverse movement of the feed shuttle 51 therebetween. This can be accomplished by providing an automatic valve 93 in the connection 70 for the upper end of the cylinder 32. This valve is adapted to be closed by a cam 93a which is carried by the extension 79 of the die head 30. The position of the cam on its bracket 93b can be adjusted (see Fig. 11) for different articles to be molded and is such that when the die head has been lifted the desired distance this cam will close the valve 93 thereby trapping the fluid in the upper end of the cylinder 32 and stopping the upward movement of the die head.

As explained above the conveying mechanism 35 provides the annular conveyor member 36 which travels in a clockwise direction around the group of molding units 15 and the molded articles are kicked off of the die bodies 29 onto this moving conveyor member. This conveyor member carries the molded articles to a delivery station designated 94 and shown in Fig. 8 of the drawings. At this point of the conveying mechanism the annular guard plate 95 is provided with an opening 96 through which the articles can be discharged from the conveyor member 35 into a chute 97.

The transfer of the articles from the conveyor member 35 to the chute 97 is accomplished by means of a traveling abutment in the form of an endless belt 98 which extends laterally through the opening 96 of the guard plate 95 and is located so as to also extend across the conveyor member at a height to be engaged by the articles being advanced by the latter. The belt 98 is mounted on a pair of pulleys 98a and 98b, the latter of which is driven in a clockwise direction so that the portion of the belt which is engaged by the articles will tend to move the articles toward and through the opening 96. The combined movements of the conveyor member 35 and the belt 98 will cause all of the articles to be displaced from the conveyor member through the opening 96 into the chute 97. From the chute 97 the molded articles can be discharged directly into a container, or as here shown, can be delivered onto a belt conveyor 99 by which the articles can be carried to a desired place of storage or further treatment.

In the conveying mechanism just described above the annular conveying member 35 is driven by a sprocket 100 which cooperates with the outer periphery of this conveying member. For this purpose the conveying member 35 can be provided with an annular series of teeth in its outer periphery or, preferably, as here shown, has a chain 101 extending around its outer periphery and anchored thereon and with which the sprocket 100 has driving engagement. The belt 98 and the conveyor 99 can be suitably driven from the shaft 102 which is in turn driven by the chain 103.

Although the molding machine 10 has been herein shown and described as having a group of the upper die plungers 68 on the die head 30 thereof, it will be understood, of course, that if desired this die head can be equipped with a single die plunger instead of such a group. In that case the die head of the machine 10 would correspond with the die head shown in the modified molding machine which is hereinafter described. It will also be understood that suitable control mechanism will be provided for controlling the supply of pressure fluid to the various cylinders and to the rotary motor 90 so as to produce the above described sequence of operation. In operating the machine 10 any desired number of the units 15 can be used and those units which are not needed can be cut out or rendered inoperative. This can be done by closing appropriately located valves 104 in the fluid pressure lines and by shifting the control lever 64 of the feed shuttle actuating linkage to the inoperative setting.

Figure 11:
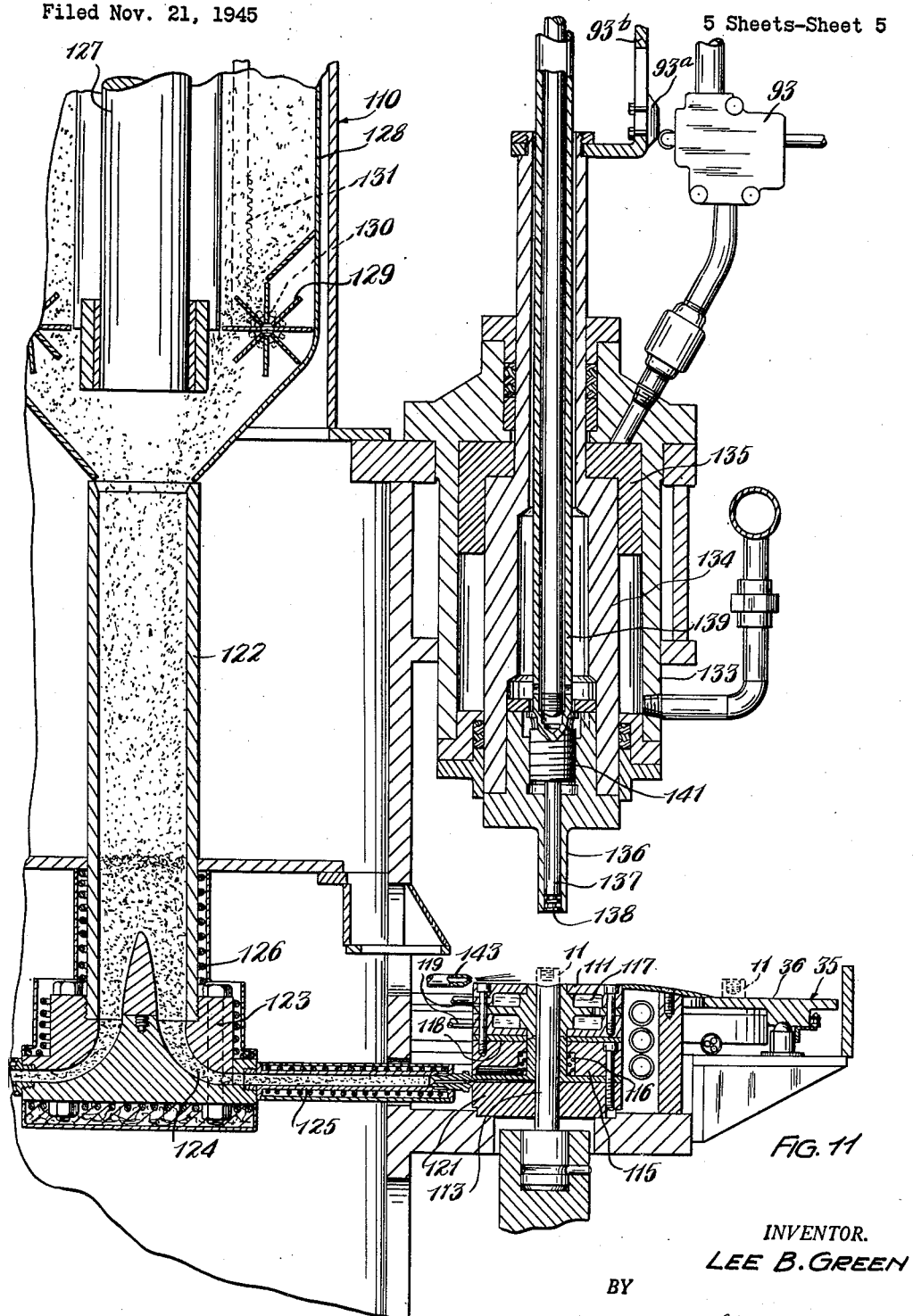
Fig. 11 is a partial vertical sectional view taken through a modified form of multiple unit plastic molding machine.

In Figs. 11, 12 and 13 of the drawings a modified form of molding machine 110 is shown which is similar to the machine 10 but differs therefrom in that it has a die head equipped with a single die plunger and is designed for use in molding articles from a thermoplastic plastic material. In this modified machine 110 the stationary die body 111 has a single bore or die cavity 112 therein and has a single lower die plunger 113 which extends upwardly into the bore of the die body and is actuated in the same manner as the die plungers 44 of the machine 10. The die body 111 has a heated section 115 surrounding the lower portion of the bore and adapted to be heated by a suitable heating coil 116. The die body also includes a cooling section 117 surrounding the bore adjacent its upper end and lying above the heating section 115. A partition 118 of thermal insulating material is disposed between the heated and cooled sections of the die body. Water or other cooling liquid can be circulated through the cooling section by means of the conduits 119.

At a point adjacent the lower end of the heated section 115 the die body 111 is provided with an inlet passage 121 which communicates with the die cavity 112 through a port 121a in the side wall thereof. The moldable thermoplastic material is contained in a central magazine 122 which, in this case, is in the form of an upright cylinder and serves all of the molding units of the machine. A head 123 provided at the lower end of the cylinder has outlet passages 124 therein for the respective molding units and which are connected with the respective inlet passages 121 by the conduits 125. The conduits 125, the head 123 and the lower portion of the cylinder 122 are maintained in a heated condition by suitable heating elements 126 extending therearound.

The thermoplastic material contained in the magazine 122 is fed or injected into the mold cavity 112 through the inlet passage 121 by applying appropriate pressure to the supply of material contained in the magazine. For this purpose the feed magazine is provided with a reciprocable plunger 127 which can be actuated by a pressure fluid cylinder or other appropriate power device (not shown). The thermoplastic material is charged into the magazine cylinder 122 from an annular bin or container 128 which surrounds the plunger 127. The material is fed downwardly from the bin 128 into the cylinder 122 by the metering devices 129. These metering devices are in the form of star wheels which are driven in timed relation to the movement of the plunger 127 by means of the pinions 130 and the racks 131 cooperating therewith. The racks 131 are actuated simultaneously with the plunger 127.

Each unit of the modified molding machine 110 is provided with an upper cylinder 133 which is similar to the upper cylinder 32 of the machine 10 and has a die head 134 reciprocable therein and provided with an actuating piston 135. The die head 134 is provided at its lower end with a hollow extension 136 which is movable into and closes the upper end of the die cavity 112. An upper die plunger 137 is rotatable and axially movable in the die head 134 so that it can be projected from and retraced into the hollow extension 136. The lower end of the die plunger 137 is provided with a threaded portion 138 which is movable into the die cavity 112 for forming the threaded recess in the article being molded.

The die plunger 137 is adapted to be rotated in the die head 134 by a hollow shaft 139 whose lower end is connected with the plunger by means of the cooperating teeth 140. The upper end of this hollow shaft is provided with a splined portion which cooperates with an actuating device 33 (see Fig. 1) which is constructed and operates in the manner already described above. The desired axial movement for unscrewing the plunger portion 138 from the molded article can be imparted to the plunger, while it is being rotated, by means of the cooperating threaded elements forming a screw connection 141 between the plunger and die head.

In the operation of this modified molding machine 110 the lower die plunger 113 is moved downwardly in the die body 111 so that its upper end is at a point below the inlet port 121a. The die head 134 is moved downwardly causing the extension 136 thereof to enter the die cavity 112 and extend into the bore thereof to a point somewhat above the port 121a depending upon the axial length of the article to be molded. The portion of the bore lying between the adjacent ends of the lower plunger 113 and the extension 136 defines the die cavity. The upper die plunger 137 is then extended or projected from the extension 136 so as to be disposed in the proper relation in the die cavity. Heated material is then injected into the die cavity from the cylinder 122 through the inlet passage 121 under the pressure applied to the material by the feed plunger 127. At this time the die cavity is lying in the heated section 115 of the die body 111 and remains in this heated section until it has been filled with the moldable material.

When the die cavity 112 has been thus filled the downward pressure on the die head 134 is removed or decreased and upward molding pressure is applied to lower plunger 113. The upwardly acting pressure of the plunger 113 subjects the material to a molding pressure in the die cavity and at the same time the lower plunger and the die head move upwardly conjointly in the bore of the die body 111. This upward movement causes the lower plunger to cut off the supply passage 121 by covering the inlet port 121a. This movement also causes the molded article to be carried out of the heated section 115 and into the cooling section 117. The movement of the lower plunger and the die head can be such as to hold the molded article temporarily in the cooling section, or if desired, can be such as to move the molded article continuously through the cooling section to the top of the die bore.

While the article is still in the upper end of the die bore the pressure being applied by the lower plunger 113 and to the die head 134 is released or removed and rotary and axial movement is then imparted to the upper die plunger 137 for retracting the threaded portion 138 by unscrewing the same from the molded article. As soon as the threaded portion of the plunger has been thus unscrewed from the article the die head is moved to its fully elevated position and the lower plunger 113 is moved further upwardly to lift the molded article out of the bore of the die body 111. The molded article is then kicked from the top of the die body so as to be transferred to the annular member 36 of the conveying mechanism 35. This is accomplished by suitable means such as the air jet 143 which directs an air blast outwardly across the upper end of the die body 111 as shown in Fig. 11. Immediately following the above described steps the lower plunger 113 is again moved downwardly in the die body and the die head 134 is also lowered to cause the extension 136 to close the die bore and cooperate with the lower plunger in again forming a die cavity. At substantially the same time the upper plunger 137 is projected from the extension 136 into the die cavity.

Although the modified molding machine 110 has been described above with a single die cavity it will be understood of course that the die members can be provided with multiple cavities and plungers similar to those described above for the machine 10.

Fig. 14 shows another modification of the molding machine 10 which consists in the use of an insert or filler 145 in the feed shuttles 51. The insert 145 serves as a metering means for measuring the amount of moldable material which is to be supplied to a die cavity which has been selected for a particular article to be molded. The insert 145 is here shown as having a single feed or metering chamber 146 therein but, if desired, this insert can have a plurality of such chambers to correspond with a grouped arrangement of die cavities.

From the foregoing description and the accompanying drawings it will now be readily understood that the present invention provides improved plastic molding machines of the multiple unit type which can be used for rapidly and economically producing various forms of molded articles.

Although the improved molding machines have been illustrated and described herein in considerable detail, it will be understood of course, that the invention is not to be regarded as being correspondingly limited but includes all changes and modifications coming within the scope of the appended claims.

Having thus described my invention, I claim:

1. In a molding machine of the character described, an endless group of stationary die bodies each having a mold cavity therein adapted to receive moldable material, means movable relative to the respective die bodies for subjecting moldable material to pressure in the mold cavities, a magazine located substantially centrally of the group of die bodies and adapted to contain a supply of said moldable material, and means for feeding the material from the magazine to the mold cavities comprising a separate feed shuttle for each die body and such shuttles being movable back and forth between said magazine and the respective die bodies of said group and operating means for imparting such movement to said shuttles.

2. In a molding machine of the character described, an endless group of stationary die bodies each having a mold cavity therein adapted to receive moldable material, means movable relative to the respective die bodies for subjecting moldable material to pressure in the mold cavities, a magazine located substantially centrally of the group of die bodies and adapted to contain a supply of said moldable material, means for feeding the material from said magazine to the die cavities comprising a separate feed shuttle for each die body and such shuttles being movable back and forth between said magazine and the respective die bodies of said group and operating means for imparting such movement to said shuttles, and conveying means disposed around said group and having a movable carrier adapted to receive molded articles from said die bodies and to carry the articles to a delivery station.

3. In a molding machine of the character described, an endless group of stationary die bodies each having a mold cavity therein adapted to receive moldable material, means movable relative to the respective die bodies for subjecting moldable material to pressure in the mold cavities, a magazine located substantially centrally of the group of die bodies and adapted to contain a supply of said moldable material, an endless group of feed shuttles disposed in substantially coaxial relation to said group of die bodies and comprising one such shuttle for each die body, said shuttles being reciprocably movable substantially radially of said group of die bodies in a back and forth travel between said magazine and the individual die bodies for transferring charges of said material to said mold cavities, and means for actuating said shuttles.

4. In a molding machine of the character described, a substantially circular group of stationary die bodies each having a mold cavity therein adapted to receive moldable material, means movable relative to the respective die bodies for subjecting moldable material to pressure in the mold cavities, a magazine located substantially centrally of the group of die bodies and adapted to contain a supply of said moldable material, an endless group of feed shuttles disposed in substantially coaxial relation to said group of die bodies and comprising one such shuttle for each die body, said shuttles being reciprocably movable substantially radially of said group of die bodies in a back and forth travel between said magazine and the individual die bodies for transferring charges of said material to said mold cavities, and means for actuating said shuttles, said feed shuttles comprising slides having material-receiving openings therein adjacent their outer ends and being movable to a discharge position over the mold cavities for feeding said material to the latter and the shuttle actuating means having operative connection with the individual shuttles at points inwardly of said openings.

5. In a molding machine of the character described, an annular group of stationary die bodies each having a mold cavity therein adapted to receive moldable material, means movable relative to the respective die bodies for subjecting moldable material to pressure in the mold cavities, a magazine located substantially centrally of the group of die bodies and adapted to contain a supply of said moldable material, an annular group of feed shuttles disposed in substantially coaxial relation to said group of die bodies and comprising one such shuttle for each die body, said shuttles being movable back and forth between said magazine and said die bodies for transferring charges of said material to said mold cavities, a common actuator located substantially centrally of said group of feed shuttles, means for moving said actuator, and means connecting the respective feed shuttles with said common actuator and enabling the latter to actuate all of said shuttles simultaneously.

6. In a molding machine of the character described, an annular group of stationary die bodies each having a mold cavity therein adapted to receive moldable material, means movable relative to the respective die bodies for subjecting moldable material to pressure in the mold cavities, a magazine located inside the group of die bodies and adapted to contain a supply of said moldable material, feed shuttles movable between said magazine and said die bodies for transferring charges of said material to said mold cavities, an annular rack located inside said group and adapted for axial movement, means for moving said rack, and linkages connecting the respective feed shuttles with said rack and including toothed members having meshing engagement with the rack.

7. In a molding machine of the character described, a group of stationary die bodies each having a mold cavity therein adapted to receive moldable material, means movable relative to the respective die bodies for subjecting moldable material to pressure in the mold cavities, a magazine located adjacent the group of die bodies and adapted to contain a supply of said moldable material, a feed shuttle for each die body and such feed shuttles being movable between said magazine and the individual die bodies for transferring charges of said material to said mold cavities, a common actuator located adjacent said group, means for moving said actuator, linkages connecting the respective feed shuttles with said common actuator, and means for rendering said linkages individually effective or ineffective.

8. In a molding machine of the character described, an annular group of stationary die bodies each having a bore therein, a pair of substantially aligned die plungers movable in each bore from opposite directions with their adjacent ends in spaced relation so as to define a die cavity in a portion of the bore, a pair of fluid pressure cylinders located on opposite sides of each die body and having pistons operable therein and connected with the die plungers for actuating the latter, said plungers being relatively movable in the bores for subjecting moldable material to pressure in the die cavities, a magazine located substantially centrally of the group of die bodies and adapted to contain a supply of said moldable material, an annular group of feed shuttles disposed in substantially coaxial relation to said group of die bodies and comprising one such shuttle for each die body, said shuttles being movable back and forth between said magazine and said die bodies for transferring charges of said material to said die cavities, and means for actuating said shuttles comprising a common actuating means located substantially on the axis of the shuttle group and adapted to actuate all of said shuttles simultaneously.

9. In a molding machine of the character described, an annular group of stationary die bodies each having a bore therein, a pair of substantially aligned die plungers movable in each bore from opposite directions with their adjacent ends in spaced relation so as to define a die cavity in a portion of the bore, a pair of fluid pressure cylinders located on opposite sides of each die body and having pistons operable therein and connected with the die plungers for actuating the latter, said plungers being relatively movable in the bores for subjecting moldable material to pressure in the die cavities, a magazine located substantially centrally of the group of die bodies and adapted to contain a supply of said moldable material, an annular group of feed shuttles disposed in substantially coaxial relation to said group of die bodies and comprising one such shuttle for each die body, said shuttles being movable back and forth between said magazine and said die bodies for transferring charges of said material to said die cavities, and means for actuating said shuttles comprising a common actuating means located substantially on the axis of the shuttle group and adapted to actuate all of the feed shuttles simultaneously, said feed shuttles comprising slides having material-receiving openings therein and being movable to a discharge position over the die cavities for feeding said material to the latter.

10. A molding machine of the character described comprising, a frame, a stationary die body on said frame and having a die cavity therein, means for supplying moldable material to said die cavity, a die head movable relative to said die body for closing and opening said die cavity, a plunger carried by said die head and having a portion movable into said cavity and adapted to shape a portion of the article being molded, means for actuating said die head, said plunger being mounted for movement in said die head and relative to said die body for disengaging the plunger from the article being molded, and means for imparting a relatively sudden disengaging movement to said plunger including a rotary shaft projecting from the die head and axially movable therewith and a rotary power device mounted on said frame and having a lost-motion driving connection with said shaft.

11. A molding machine of the character described comprising, a frame, a stationary die body on said frame and having a die cavity therein, means for supplying moldable material to said die cavity, a pressure fluid cylinder on said frame and spaced from said die body, a die head movable relative to said die body for closing and opening said die cavity and having a portion thereof reciprocable in said cylinder and forming a piston therein, a plunger carried by said die head and having a portion movable into said cavity and adapted to shape a portion of the article being molded, said plunger being mounted for movement in said die head and relative to said die body for disengaging the plunger from the molded article, a shaft extending into said cylinder and die head and having operative connection with said plunger for imparting the disengaging movement to the latter, said shaft being movable axially thereof with said die head, a power device on said frame, and means forming a spline connection between said shaft and power device.

12. A molding machine of the character described comprising, a frame, a stationary die body on said frame and having a die cavity therein, means for supplying moldable material to said die cavity, a pressure fluid cylinder on said frame and spaced from said die body, a die head movable relative to said die body for closing and opening said die cavity, a piston reciprocable in said cylinder and connected with said die head, a plunger carried by said die head and having a portion movable into said cavity and adapted to shape a portion of the article being molded, said plunger being mounted for rotary and axial movement in said die head and relative to said die body for disengaging the plunger from the molded article, a rotary shaft extending into said die head and operably connected with said plunger for imparting said rotary movement thereto, cooperating screw elements on said die head and plunger for producing said axial movement of the plunger, said shaft being movable axially thereof with said die head, a power device on said frame, and means forming a spline connection between said shaft and power device.

13. A molding machine of the character described comprising, a frame, a stationary die body on said frame and having a die cavity therein, means for supplying moldable material to said die cavity, a pressure fluid cylinder on said frame and spaced from said die body, a die head movable relative to said die body for closing and opening said die cavity and having a portion thereof reciprocable in said cylinder and forming a piston therein, a plunger carried by said die head and having a portion movable into said cavity and adapted to shape a portion of the article being molded, said plunger being mounted for rotary and axial movement in said die head and relative to said die body for disengaging the plunger from the molded article, a rotary shaft extending into said die head and operably connected with said plunger for imparting said rotary movement thereto, cooperating screw elements on said die head and plunger for producing said axial movement of the plunger, said shaft being movable axially thereof with said die head, a power device on said frame, and means forming a spline connection between said shaft and power device.

14. A molding machine of the character described comprising, a frame, a stationary die body on said frame and having bores providing a group of die cavities therein, means for supplying moldable material to said die cavities, a pressure fluid cylinder on said frame and spaced from one side of said die body, a die head movable relative to said die body for closing and opening said die cavities, a piston reciprocable in said cylinder and connected with said die head, a first group of plungers carried by said die head and having portions movable into the respective die cavities from one end of said bores and adapted to shape portions of the articles being molded, said first plungers being mounted for movement in said die head and relative to the die body for disengaging said first plungers from the molded articles, a second group of plungers extending into said bores from the one end thereof and cooperating with the first plungers in forming said die cavities and in subjecting said material to molding pressure, a rotary shaft extending into said die head and having operative connection with said first plungers for imparting the disengaging movement to the latter simultaneously, said second plungers being also movable in said bores for expelling the molded articles from said cavities, a second power cylinder on the other side of said die body, a piston operable in said second power cylinder and connected with said second plungers, said shaft being movable axially thereof with said die head, a power device on said frame, and means forming a spline connection between said shaft and power device.

15. A molding machine of the character described comprising, a frame, a stationary die body on said frame and having a group of die cavities therein, means for supplying moldable material to said die cavities, a pressure fluid cylinder on said frame and spaced from said die body, a die head movable relative to said die body for closing and opening said die cavities, a piston reciprocable in said cylinder and connected with said die head, a group of plungers carried by said die head and having portions movable into the respective die cavities and adapted to shape portions of the articles being molded, said plungers being mounted for rotary and axial movement in said die head and relative to the die body for disengaging the plungers from the molded articles, a shaft extending into said cylinder and die head, said shaft being movable axially thereof with said die head, gears connected with said plungers and disposed in a group in said die head, a driving pinion on said shaft and meshing with the grouped gears for imparting said rotary movement to the plungers, cooperating screw elements on said plungers and die head for imparting said axial movement to the plungers, a power device on said frame, and means forming a spline connection between said shaft and power device.

16. In a molding machine of the character described, a frame, a stationary die body on said frame and having a die cavity therein, means for supplying moldable material to said die cavity, a pressure fluid cylinder on said frame and spaced from said die body, a die head movable relative to said die body for closing and opening said die cavity, a piston reciprocable in said cylinder and connected with said die head, a plunger carried by said die head and having a portion movable into said cavity and adapted to shape a portion of the article being molded, said plunger being mounted for rotary and axial movement in said die head and relative to said die body for disengaging the plunger from the molded article, a rotary shaft extending into said die head and operably connected with said plunger for imparting said rotary movement thereto, cooperating screw elements on said die head and plunger for producing said axial movement of the plunger, a power device on said frame comprising a rotatable hub and a motor adapted to drive the same, said shaft being movable axially thereof with said die head and extending through said hub, and means forming a spline connection between said shaft and hub.

17. In a molding machine of the character described, a frame, a stationary die body on said frame and having a die cavity therein, means for supplying moldable material to said die cavity, a pressure fluid cylinder on said frame and spaced from said die body, a die head movable relative to said die body for closing and opening said die cavity, a piston reciprocable in said cylinder and connected with said die head, a plunger carried by said die head and having a portion movable into said cavity and adapted to shape a portion of the article being molded, said plunger being mounted for rotary and axial movement in said die head and relative to said die body for disengaging the plunger from the molded article, a rotary shaft extending into said die head and operably connected with said plunger for imparting said rotary movement thereto, cooperating screw elements on said die head and plunger for producing said axial movement of the plunger, a power device on said frame comprising a rotatable hub and a motor for driving said hub, said shaft being movable axially thereof with said die head and extending through said hub, means forming a spline connection between said shaft and hub, and means forming a lost-motion driving connection between said motor and hub and enabling said hub to impart a sudden rotary movement to said shaft.

18. In a molding machine of the character described, a frame, an annular group of die bodies on said frame and each having a bore therein providing a die cavity adapted to receive moldable material, an annular group of power cylinders on said frame at one side of said group of die bodies and providing one such cylinder for each die body, a second annular group of power cylinders on said frame at the other side of said die bodies and also providing one such cylinder for each die body, pistons operable in the power cylinders of such annular groups, plunger means connected with the pistons of the first annular group of cylinders and movable into the bores of said die bodies from one end and having portions adapted to shape portions of the articles being molded, plunger means connected with the pistons of the second annular group of cylinders and movable into said bores from the other end for cooperation with the first plunger means in subjecting said material to molding pressure and being also movable in said bores for expelling the molded articles therefrom, a magazine located substantially centrally of said group of die bodies and adapted to contain a supply of said moldable material, a feed shuttle for each die body and being movable back and forth between said magazine and die body for supplying moldable material to the die cavity of the latter, and a common actuating means for all of the feed shuttles.

19. In a molding machine of the character described, a frame, an annular group of die bodies on said frame and each having a bore therein providing a die cavity adapted to receive moldable material, an annular group of power cylinders on said frame at one side of said group of die bodies and providing one such cylinder for each die body, a second annular group of power cylinders on said frame at the other side of said die bodies and also providing one such cylinder for each die body, pistons operable in the power cylinders of such annular groups, an annular group of die heads on said one side of said die bodies and connected with the pistons of the first annular group of cylinders, plunger means carried by said die heads and movable into the bores of said die bodies from one end and having portions adapted to shape portions of the articles being molded, plunger means connected with the pistons of the second annular group of cylinders and movable into said bores from the other end for cooperation with the first plunger means in subjecting said material to molding pressure and being also movable in said bores for expelling the molded articles therefrom, the plunger means of said die heads being mounted therein for rotary and axial movement for disengaging the plungers from the molded articles, rotary shafts extending into the respective die heads, means in said die heads and adapted to be driven by said rotary shafts for causing said rotary and axial movement to be imparted to said first plunger means, said shafts being movable axially thereof with said die heads, an annular group of power devices on said frame, means forming spline connections between said shafts and said power devices, a magazine located substantially centrally of said group of die bodies and adapted to contain a supply of said moldable material, a feed shuttle for each die body and being movable back and forth between said magazine and die body for supplying moldable material to the die cavity of the latter, and a common actuating means for the feed shuttles.

LEE B. GREEN.

REFERENCES CITED

The following references are of record in the file of this patent:

UNITED STATES PATENTS

| Number | Name | Date |
|---|---|---|
| 2,212,483 | Soubier | Aug. 20, 1940 |
| 2,218,456 | Soubier | Oct. 15, 1940 |
| 2,228,614 | Soubier | Jan. 14, 1941 |
| 2,306,205 | Crosman | Dec. 22, 1942 |
| 2,326,382 | Moreland | Aug. 10, 1943 |
| 2,363,808 | Sayre | Nov. 28, 1944 |

FOREIGN PATENTS

| Number | Country | Date |
|---|---|---|
| 696,643 | Germany | Sept. 26, 1940 |
| 3,810 | Great Britain | Mar. 24, 1885 |